US012644500B2

(12) United States Patent
Picard et al.

(10) Patent No.: US 12,644,500 B2
(45) Date of Patent: Jun. 2, 2026

(54) BELT AND ACTUATOR BELT SYSTEM

(71) Applicant: ABB E-mobility B.V., Delft (NL)

(72) Inventors: Luc Picard, Zaventem (BE); Johan Peeters, Korbeel-Lo (BE)

(73) Assignee: ABB E-mobility B.V., Delft (NL)

( * ) Notice: Subject to any disclaimer, the term of this patent is extended or adjusted under 35 U.S.C. 154(b) by 0 days.

(21) Appl. No.: 18/785,660

(22) Filed: Jul. 26, 2024

(65) Prior Publication Data

US 2025/0035186 A1 Jan. 30, 2025

(30) Foreign Application Priority Data

Jul. 28, 2023 (EP) ..................................... 23188484

(51) Int. Cl.
F16G 1/28 (2006.01)
(52) U.S. Cl.
CPC ..................................... F16G 1/28 (2013.01)
(58) Field of Classification Search
CPC ... F16G 1/28; F16G 13/20; F16G 5/20; F16G 1/10; F16H 19/0636; B66F 3/06; E05Y 2201/656; E05Y 2201/724; B25J 18/02
See application file for complete search history.

(56) References Cited

U.S. PATENT DOCUMENTS

| | | | | | |
|---|---|---|---|---|---|
| 2,375,461 A | * | 5/1945 | Bender | ................... | F16G 13/12 |
| | | | | | 74/37 |
| 2,554,300 A | * | 5/1951 | Hayakawa | .............. | F16G 13/20 |
| | | | | | 254/95 |
| 3,012,635 A | * | 12/1961 | Blain | ................... | H01Q 1/1235 |
| | | | | | 187/250 |
| 3,645,146 A | * | 2/1972 | Nagin | ..................... | F16G 13/06 |
| | | | | | 254/133 R |
| 4,719,840 A | * | 1/1988 | Goodell | ................... | F41A 9/43 |
| | | | | | 89/47 |
| 4,726,247 A | * | 2/1988 | Hormann | ............ | F16H 25/2409 |
| | | | | | 74/424.6 |
| 5,271,182 A | * | 12/1993 | Greisner | ............... | E05F 15/619 |
| | | | | | 49/325 |
| 5,347,770 A | * | 9/1994 | McDonnell | ........... | E04H 12/185 |
| | | | | | 52/108 |
| 5,355,643 A | * | 10/1994 | Bringolf | ................... | B66F 3/06 |
| | | | | | 24/418 |
| 5,803,418 A | * | 9/1998 | Bringolf | ............... | E04H 12/185 |
| | | | | | 248/161 |
| 6,419,603 B1 | * | 7/2002 | Grasl | ..................... | F16G 13/20 |
| | | | | | 474/251 |

(Continued)

OTHER PUBLICATIONS

European Patent Office, Extended European Search Report in European Patent Application No. 23188484.2, 6 pp. (Jan. 29, 2024).

*Primary Examiner* — Henry Y Liu
(74) *Attorney, Agent, or Firm* — McCarter & English, LLP

(57) ABSTRACT

A belt includes a plurality of elements connected to each other having a first link element and at least a second link element connected to each other by a connecting bridge member; wherein each of the link elements has a body from which a first bump element and opposite to the first bump element a second bump element elevates; wherein both bump elements are configured in a tooth-like shape; and at least a flat-shaped inlay element of a flexible material that is embedded inside the belt in the first link element and the connecting bridge member.

10 Claims, 4 Drawing Sheets

(56) References Cited

U.S. PATENT DOCUMENTS

| | | | | |
|---|---|---|---|---|
| 6,530,177 B1 * | 3/2003 | Soerensen | F16G 13/20 | 49/325 |
| 7,270,619 B2 * | 9/2007 | Bourc'His | F16G 13/20 | 474/251 |
| 7,448,414 B2 * | 11/2008 | Langeland | F16L 9/22 | 138/120 |
| 7,621,078 B2 * | 11/2009 | Phelan | F16G 13/20 | 52/118 |
| 7,921,986 B2 * | 4/2011 | Ando | F16H 19/0636 | 414/560 |
| 8,069,954 B2 * | 12/2011 | Kempf | B66F 13/005 | 254/133 R |
| 8,206,251 B2 * | 6/2012 | Fan | F16G 5/20 | 474/205 |
| 8,328,670 B2 * | 12/2012 | Suko | B66F 7/0666 | 254/358 |
| 8,333,674 B2 * | 12/2012 | Fan | F16G 5/20 | 474/205 |
| 8,341,931 B2 * | 1/2013 | Ando | F16G 13/20 | 187/250 |
| 8,425,357 B2 * | 4/2013 | Fan | F16G 5/20 | 474/205 |
| 8,776,491 B2 * | 7/2014 | Oitaka | F16G 13/20 | 254/358 |
| 8,863,810 B2 * | 10/2014 | Kuroi | G03B 21/58 | 160/133 |
| 8,967,005 B2 * | 3/2015 | Saji | F16G 13/20 | 74/89.2 |
| 8,984,975 B2 * | 3/2015 | Saji | F16G 13/20 | 74/89.2 |
| 9,243,686 B2 * | 1/2016 | Saji | F16G 13/06 | |
| 9,482,313 B2 * | 11/2016 | Saji | B66F 3/06 | |
| 9,541,161 B2 * | 1/2017 | Kaisaku | B66F 13/005 | |
| 10,005,189 B2 * | 6/2018 | Yoon | F16G 13/20 | |
| 10,406,697 B2 * | 9/2019 | Yoon | B25J 18/02 | |
| 11,261,938 B2 * | 3/2022 | Yoon | F16G 13/06 | |
| 11,272,626 B2 * | 3/2022 | Lee | G06F 1/1601 | |
| 11,446,829 B2 * | 9/2022 | Yoo | B25J 9/102 | |
| 11,553,610 B2 * | 1/2023 | Lee | H05K 5/0217 | |
| 11,692,612 B2 * | 7/2023 | Prevost | F16H 19/0636 | 74/89.21 |
| 2004/0157691 A1 * | 8/2004 | Olmsted | E05F 15/67 | 474/206 |
| 2004/0220004 A1 * | 11/2004 | Bourc'His | B66F 3/06 | 474/152 |
| 2006/0219144 A1 * | 10/2006 | Phelan | B66F 3/06 | 114/90 |
| 2006/0272728 A1 * | 12/2006 | Langeland | F16H 19/0636 | 138/158 |
| 2009/0166155 A1 * | 7/2009 | Hishioka | B65G 47/5181 | 198/459.6 |
| 2010/0059727 A1 * | 3/2010 | Suko | B66D 3/20 | 254/362 |
| 2010/0140572 A1 * | 6/2010 | Aoki | F16G 13/20 | 474/217 |
| 2010/0223901 A1 * | 9/2010 | Ando | B66F 7/0666 | 59/82 |
| 2010/0279808 A1 * | 11/2010 | Fan | F16G 5/20 | 474/205 |
| 2011/0047700 A1 * | 3/2011 | Klemm | A61B 6/0487 | 5/600 |
| 2013/0053200 A1 * | 2/2013 | Fan | F16G 5/20 | 474/205 |
| 2013/0190120 A1 * | 7/2013 | Fan | F16G 5/06 | 474/205 |
| 2013/0205927 A1 * | 8/2013 | Saji | B66F 3/06 | 74/30 |
| 2013/0276422 A1 * | 10/2013 | Saji | F16G 13/20 | 59/93 |
| 2013/0283945 A1 * | 10/2013 | Kaisaku | B66F 13/005 | 74/89.21 |
| 2013/0298705 A1 * | 11/2013 | Saji | F16H 19/04 | 74/30 |
| 2014/0041467 A1 * | 2/2014 | Saji | F16G 13/04 | 74/30 |
| 2014/0076082 A1 * | 3/2014 | Saji | F16G 13/20 | 74/422 |
| 2019/0113104 A1 * | 4/2019 | Yoon | F16G 13/20 | |
| 2021/0246966 A1 * | 8/2021 | Schaper | B29D 29/00 | |

* cited by examiner

SECTION A-A

SECTION B-B

BELT AND ACTUATOR BELT SYSTEM

CROSS-REFERENCE TO RELATED APPLICATIONS

The instant application claims priority to European Patent Application No. 23188484.2, filed Jul. 28, 2023, which is incorporated herein in its entirety by reference.

FIELD OF THE DISCLOSURE

The present disclosure relates to belt and an actuator belt system.

BACKGROUND OF THE INVENTION

In prior art, chains are used to be driven by actuator system such as gears that drive the chain and also may further stack the link elements of the chain. Such a chain in combination with a corresponding actuator means may be used to lift or to push a load or drive a rotating element.

In a further application, a chain or to be more general, this connecting actuator element or belt actuator may be used by a robotic system to change a position of a tooling member that is connected to the robotic system via the connecting elements.

However, these chains known in prior art are made of metal which makes the chain difficult to handle due to its weight and its often rigid structure. Also the production of such a chain is difficult and expensive due to a complex production process of connecting the plurality of link elements of such a chain in an end-to-end manner. Further, the application of such a chain is usually restricted to a certain technical field.

BRIEF SUMMARY OF THE INVENTION

Therefore, it would be advantageous to provide an improved concept for a belt and a belt actuator system that can be manufactured in an easy and cost-efficient manner and is further easy to adaptable for different applications.

In a first aspect of the present invention, there is provided a belt comprising:

a plurality of elements connected to each other having a first link element and at least a second link element connected to each other by a connecting bridge member, wherein each of the link elements having a body from which a first bump element and opposite to the first bump element a second bump element elevates, and at least a flat-shaped inlay element of a flexible material that is embedded inside the belt in the first link element and the connecting bridge member.

One notable aspect of the belt is that the belt has a flat-shaped inlay element of a flexible material that is embedded inside of the belt that allows the belt to be flexible. However, when two belts are rolled into each other in a zipped-like manner, the belt system becomes very stiff and can be used for example in an actuator system as connecting means or force transmitting means to drive or to move for example a tool that is connected to the actuator belt system.

BRIEF DESCRIPTION OF THE SEVERAL VIEWS OF THE DRAWING(S)

DETAILED DESCRIPTION OF THE INVENTION

Figure 1:
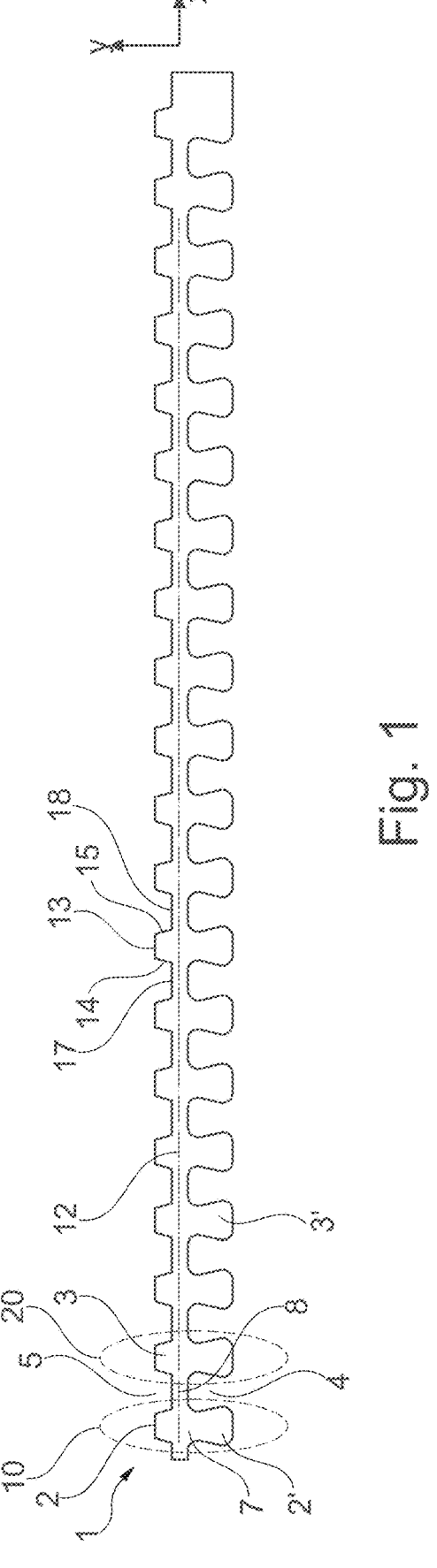
FIG. 1 is a schematic example of a belt according to an embodiment of the present disclosure.

FIG. 1 illustrates a schematic example of a belt 1 according to an embodiment of the present disclosure. The belt 1 comprises a plurality of elements 10, 20 connected to each other in an end-to-end-manner having a first link element 10 and at least a second link element 20 connected to each other by a connecting bridge member 8. Each of the link elements 10, 20 having a body 7 from which a first bump element 2, 3 and opposite to the first bump element 2, 3 a second bump element 2', 3' elevates. Or in other words, the tooth-shaped first bump element 2, 3 and forming the top element or top side or front side of the belt 1, is opposite to the tooth-shaped second bump element 2', 3' which forms the bottom element or backside of the belt 1.

The first bump element 2, 3 forms an end-to-end connection line to the second bump element 2', 3'. The first bump element 2, 3 and the second bump element 2', 3' arranged in FIG. 1 in a synchronized or regular manner. However, in an optional embodiment of the belt 1, an unsynchronized arrangement of the first bump element 2, 3 and the second bump element 2', 3' or a combination thereof may also be possible.

Both bump elements 2, 2', 3, 3' are configured in a tooth-like shape. Optionally, the first bump element 2, 2' of the first link element 10 and the first bump element 3, 3' of the second link element 20 are configured to form a cavity or a notch 4, 5 between the first bump element 2, 2' and the second bump element 3, 3'. The base or bottom of the notch 4, 5 is formed by the bridge member 8.

As shown in FIG. 1, the tooth-shaped bump element 2, 2', 3, 3' of the link element 10, 20 has a surface 13 comprising a first rising edge element 14 that is connected to a first base element 17 and a second falling edge element 15 that is connected to a second base element 18.

The form or shape of the bump elements 2, 3 of the topside of the belt 1 may be the same or may differ. The form or shape of the bump elements 2, 3 of the topside compared to the form of the bump elements 2', 3' arranged on the backside of the belt 1 of the belt 1 may be the same or may differ, depending on the field of application of the belt 1. The form or shape of the bump elements 2, 2', 3, 3' may be of any preferred shape, e.g. rectangular, triangular, rounded etc.

The bump elements 2, 2', 3, 3' may have any preferred size and or thickness depending on the used-case of application. However, the number of teeth or number of bump elements 2, 2', 3, 3' or link elements 10, 20 on the topside and on the backside of the belt 1 is the same.

According to FIG. 1, a height (see y-axis in FIG. 1) of the first bump element 2, 3 is larger than a height of the second burn element 2', 3'. However, it may also be possible that the first bump element 2, 3 of the second bump element 2', 3' differ in their heights related to a horizontal x-axis shown in FIG. 1.

Each of the link elements 10, 20 and the connecting bridge members 8 between each link element 10, 20 of the belt 1 is made of one material that is non-compressible and flexible. The one material is at least one of a PU material or a rubber material to enable the entire belt 1 to be movable in a flexible manner.

In an embodiment of the present invention, the belt 1 of the present invention is made of PU material and steel cords 12. The base of the belt 1 is optionally a T10 belt form (tooth) and on the backside of this T10 part a special for this purpose designed tooth form is added. The belt 1 may further be made of a solid material.

A flat-shaped inlay element 12 of a flexible material is embedded or arranged in a longitudinal direction inside the belt 1 in the first link element 10 and the connecting bridge member 8. In FIG. 1, the inlay element 12 is as an example embodiment a continuously arranged element that deviates in a horizontal direction through all bump elements 2, 2', 3, 3' and bridge members 8.

The inlay element 12 is made of at least one of the following flexible material: steel, fiberglass, carbon fiber, nylon. The preferred material of the inlay element or chord 12 should be of that kind that the inlay element 12 does not stretch inside the belt 1.

Figures 2A, 2B, 3:
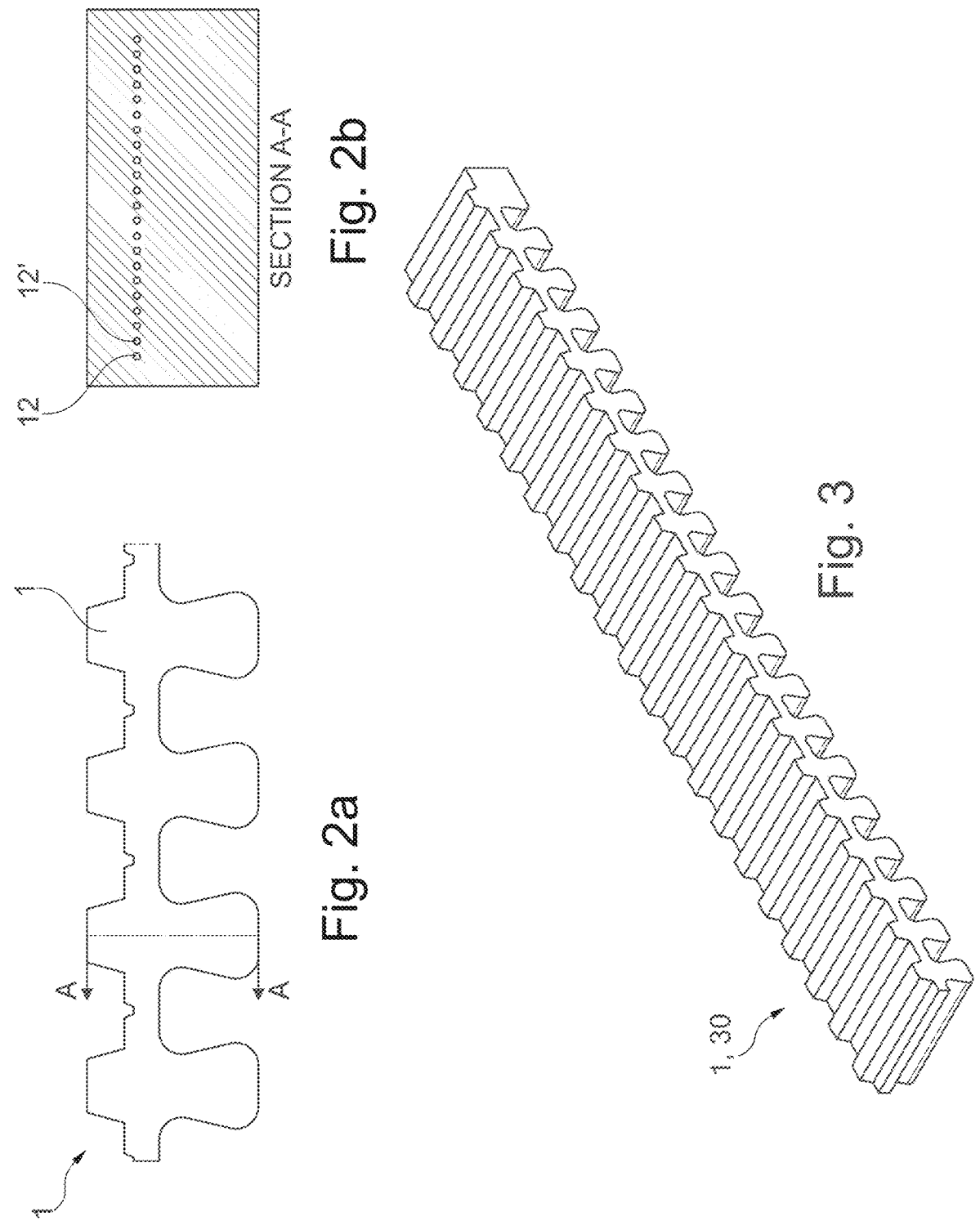
FIG. 2a is a schematic example of a part of the belt according to an embodiment of the present disclosure.
FIG. 2b is a sectional view of a belt according to an embodiment of the present disclosure.
FIG. 3 is a schematic example of a belt in 3D view according to an embodiment of the present disclosure.

FIG. 2a illustrates a schematic example of a part of the belt 1 according to an embodiment of the present invention indicating a sectional view A-A that is detailed in FIG. 2b. In particular, FIG. 2a shows a link element with a first bump element on the topside and a second bump element opposite the first bump element on the backside.

In FIG. 2b, the horizontal arrangement of the plurality of inlay elements 12, 12' in shown. The FIG. 2b further shows, contrary to the embodiment of the belt 1 of FIG. 1 in an optional embodiment a plurality of single inlay-elements 12, 12' that are arranged in a certain distance between each other between the first bump element and the second bump element. The inlay elements 12, 12' may be flat shaped, but the shape is not restricted to such an embodiment.

Preferably, each of the plurality of inlay elements 12, 12' comprises of a single material or different materials.

FIG. 3 illustrates a schematic example of the belt 1 as detailed in FIG. 1 in a 3D view according to an embodiment of the present disclosure.

Figures 4A, 4B:
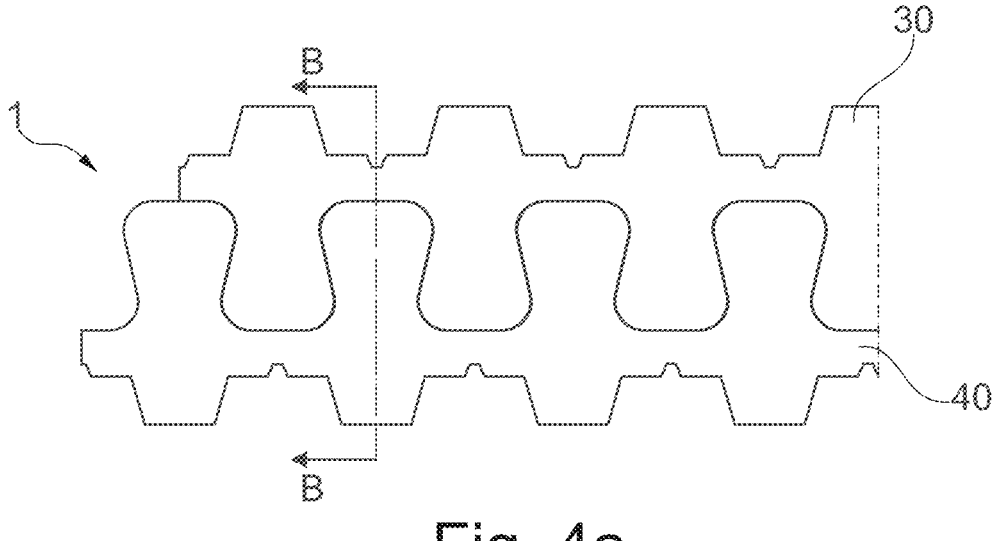
FIG. 4a is a schematic example of a belt according to an embodiment of the present disclosure.
FIG. 4b is a sectional view of a belt according to an embodiment of the present disclosure.

FIG. 4a illustrates a schematic example of a belt 1 according to an embodiment of the present invention. The belt 1 consists of a first belt element 30 and a second belt element 40 that are arranged in a zip-fastening manner and are both rolled into each other. The bump element 2, 2' (see FIG. 1) of the first belt element 30 is arranged or located inside a corresponding cavity or notch 4, 5 (see FIG. 1) of the second belt element 40. In this shown arrangement of the two belt elements 30, 40, the entire belt 1 becomes very stiff. The rolling the separate belt elements 30, 40 may be done by an actuator system.

FIG. 4b illustrates a sectional view of a belt 1 with the two belt elements 30, 40 according to FIG. 4a. In FIG. 4a the horizontal arrangement of the inlay elements or chords 32, 32' (upper line of dots) and 42, 42' (base line of dots) of the two belt elements 30, 40 of the belt 1 as shown in FIG. 4a can be seen.

Figures 5A, 5B:
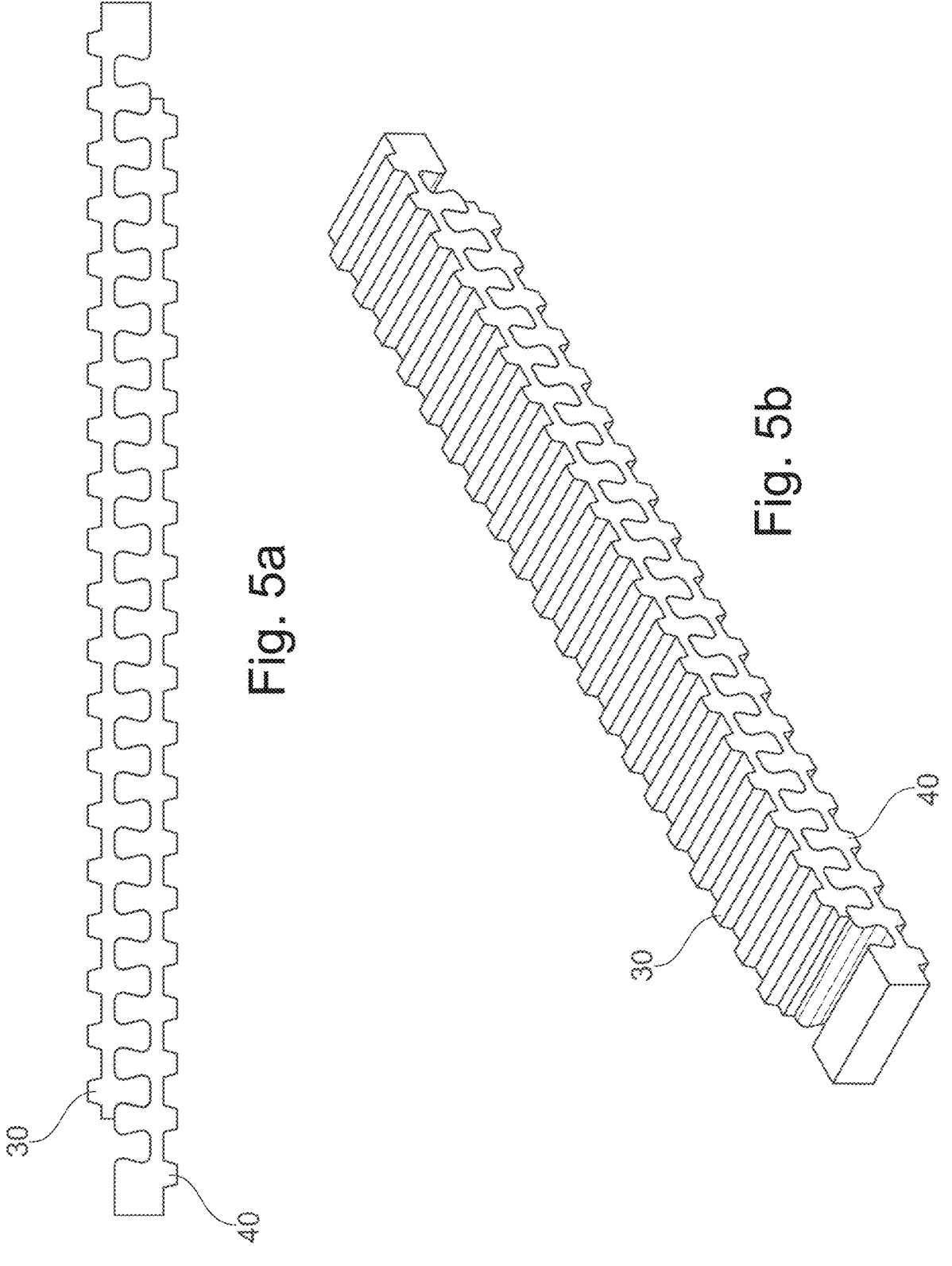
FIG. 5a is a schematic example of a belt in 3D view according to an embodiment of the present disclosure.
FIG. 5b is a schematic example of a belt in 3D view according to an embodiment of the present disclosure.

FIG. 5a illustrates a schematic example of a belt 1 having a first belt element 30 and a second belt element 40 interconnected to each other in a zip-fastening manner, as described in FIG. 5b. The belt 1 is very flexible as a single belt, but when the two belt elements 30, 40 are rolled into each other they become very stiff.

FIG. 5b illustrates a schematic example of the belt 1 of FIG. 5a in a 3D view according to an embodiment of the present invention.

As the belt is made of one single material, the manufacturing of the belt is easy and cost-efficient.

A further advantage of the belt is that it can be easily adapted to different fields of applications.

According to an example, the link element and the connecting bridge member is made of one material that is non-compressible and flexible. In this way, the belt can be easily and at low costs manufactured and be easily used for different technical applications.

According to an example, the one material of the belt is at least one of a PU material or a rubber material. In this way, the belt can be easily and at low costs manufactured.

According to an example, the belt comprising of a solid material. In this way, the advantage is achieved that the belt does hardly deform under pressure or is able to withstand a certain pressure.

According to an example, the inlay element is made of at least one of the following flexible material: steel, fiberglass, carbon fiber, nylon. In this way, the belt can be easily adapted to changing technical requirements that are required when the belt is used in different technical fields of applications.

According to an example, the inlay element of the belt comprises a plurality of single inlay elements that are distanced between each other. In this way, the belt can be made flexible.

According to an example, each of the plurality of inlay elements comprises of a single material or different materials. In this way, the properties of the belt can be easily adapted to the needs of different applications.

According to an example, the tooth-shaped bump element of a link element has a surface comprising a first rising edge element that is connected to a first base element and a second falling edge element that is connected to a second base element. In this way, a simple and cost-efficient geometry of the belt is provided that can be easily adapted.

According to an example, the tooth-shaped bump elements are arranged in a synchronized manner. In this way, the belt can be easily manufactured.

In a second aspect of the present invention, a belt actuator system is provided, wherein the belt actuator system comprises a first belt element and a second belt element, wherein the first belt element is positioned on the second belt element in a zip-fastening manner in which the bump element of the first belt element is arranged or located inside a corresponding cavity of the second belt element.

The belt system or belt actuator system comprises at least a second belt element, for example, a second belt element as described above or below.

The belt actuator system may comprise a first belt element and a second belt element, wherein the first belt element is positioned on the second belt element in a zip-fastening manner in which the bump element of the first belt element is arranged or located inside a corresponding cavity of the second belt element.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

LIST OF REFERENCE SIGNS

1 Belt
2, 2' First bump element
3, 3' Second bump element
4, 5 cavity/notch
7 Body
8 Bridge member
10 First link element
12, 12' Inlay element
13 Surface
14 First rising edge element
15 Falling edge element
17 First base element
18 Second base element
20 Second link element
30 Belt element 32, 32' Inlay element
40 Belt element
42, 42' Flat-shaped inlay element
50 Belt actuator system

What is claimed is:

1. A first belt element for a belt actuator system, the first belt element comprising:
a plurality of elements connected to each other having a first link element and at least a second link element connected to each other by a connecting bridge member;
wherein each of the link elements has a body from which a first bump element and opposite to the first bump element a second bump element elevates,
wherein the first and second bump elements are configured in a tooth-like shape, and
at least a flat-shaped inlay element made of a flexible material that is embedded inside the first belt element in the first link element and the connecting bridge member,
wherein the first belt element is configured to be positioned on a second belt element in a zip-fastening manner in which the second bump element of the first belt element is arranged or located inside a corresponding cavity of the second belt element.

2. The first belt element according to claim 1, wherein the link element and the connecting bridge member is made of one material that is non-compressible and flexible.

3. The first belt element according claim 2, wherein the one material is at least one of a PU material or a rubber material.

4. The first belt element according to claim 1, further comprising a solid material.

5. The first belt element according to claim 1, wherein the inlay element is made of at least one of the following flexible materials: steel, fiberglass, carbon fiber, nylon.

6. The first belt element according to claim 1, wherein the inlay element comprises a plurality of single inlay elements that are distanced between each other.

7. The first belt element according to claim 1, wherein each of the plurality of inlay elements comprises a single material or different materials.

8. The first belt element according to claim 1, wherein the tooth-shaped bump element of the first and/or second link element has a surface comprising a first rising edge element that is connected to a first base element and a second falling edge element that is connected to a second base element.

9. The first belt element according to claim 1, wherein the tooth-shaped bump elements are arranged in a synchronized manner.

10. A belt actuator system comprising:
the first belt element according to claim 1, and
a second belt element,
wherein the first belt element is positioned on the second belt element in a zip-fastening manner in which the second bump element of the first belt element is arranged or located inside a corresponding cavity of the second belt element.

* * * * *